Patented Nov. 6, 1945

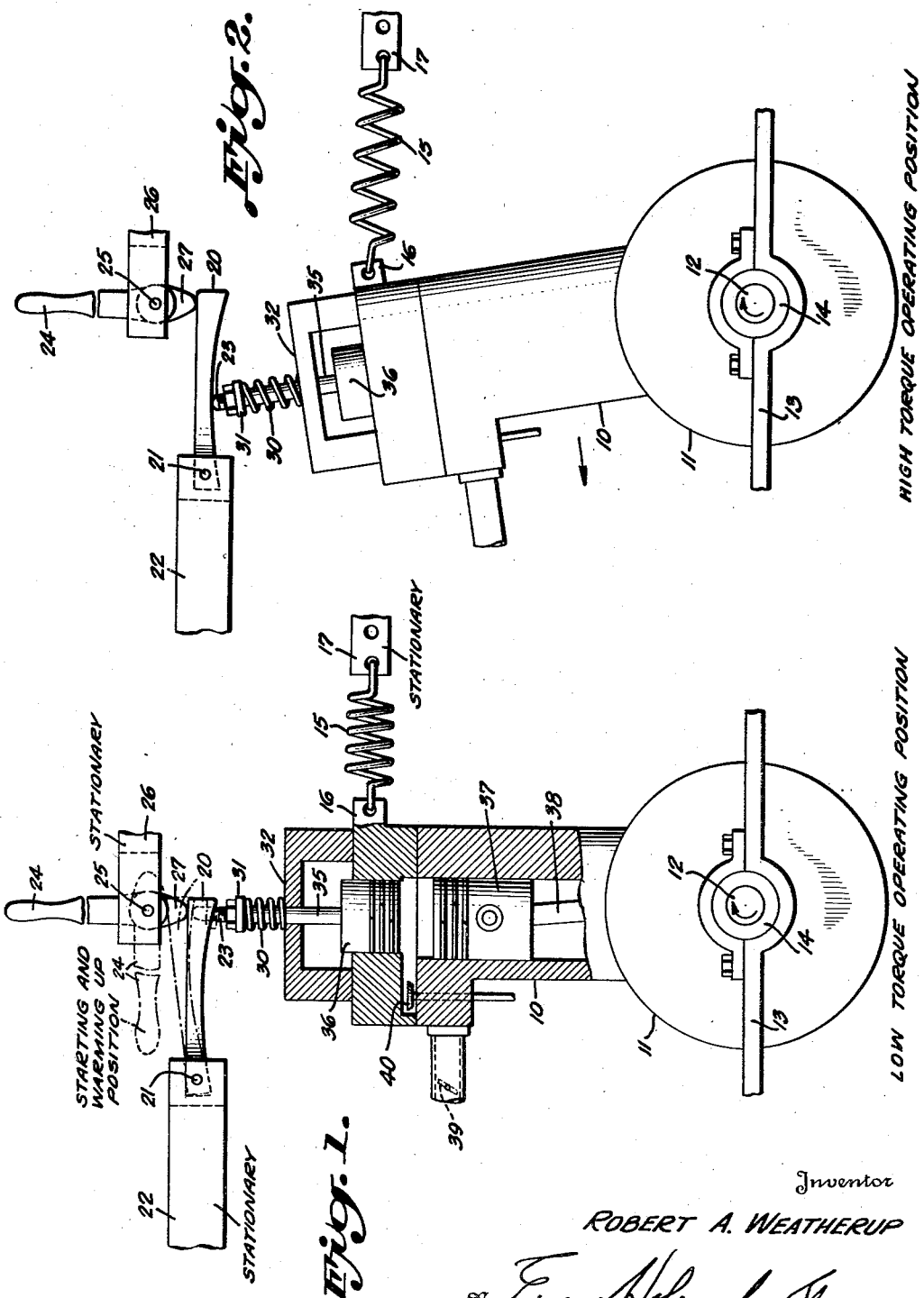

2,388,452

UNITED STATES PATENT OFFICE 2,388,452

GASOLINE ENGINE

Robert A. Weatherup, Jacksonville, Fla.

Application August 31, 1944, Serial No. 552,057

15 Claims. (Cl. 123—48)

This invention relates to engines and more particularly to engines of the gasoline type.

A primary object of this invention is the provision of simple and efficient means to keep the compression pressure constant in the cylinder of a gas engine as the load varies.

A further object is the provision of means to accomplish the foregoing object by varying the compression ratio in accordance with the engine torque.

A further object is the provision of practical means for increasing the thermal efficiency of such an engine when the engine is developing a manifold vacuum.

A still further object is the provision of reliable means making possible economical mixtures of air and fuel.

Another object is the provision of means enabling the simplification of the ignition timing under variable conditions.

A further object of this invention is to stabilize the compression pressure at a value just below that which will cause detonation.

Other objects will in part be obvious and in part pointed out hereinafter.

This invention accordingly consists in the features of construction, combination of parts, and in the unique relation of the members and in the relative proportioning and disposition thereof, all as more completely outlined herein.

To enable others skilled in the art fully to comprehend the underlying features of this invention, that they may embody the same by the numerous modifications in structure and relation contemplated by the invention, a drawing depicting a preferred embodiment of the invention forms a part of this disclosure, and in such drawing like characters of reference denote corresponding parts throughout the several views in which Fig. 1 is a semi-diagrammatic end view taken transversely through a multi-cylinder engine, showing any one of the cylinders partly in section and the mounting thereof, together with certain other features of this inventive concept, and Fig. 2 is a view similar to Fig. 1 showing certain operating parts in different positions of adjustment.

As conducive to a clearer understanding of this invention it may here be pointed out that, in a gasoline engine it is desirable to keep the compression pressure in the cylinders substantially constant in the interests of thermal efficiency.

This involves varying the clearance volume as the vacuum in the intake manifold changes. Manifold vacuum is caused by the throttling of the charge (gasoline or gas and air) by means of the butterfly valve (or throttle valve). The butterfly valve is used to regulate the speed of the engine by controlling the mass of the charge entering the cylinder (or cylinders). The greater the mass of the charge, the greater the energy liberation possible in the cylinder, and, therefore, the greater will be the speed providing the load is constant.

With "regular" gasolines the compression ratio is limited to about 6:1 because higher ratios cause compression knock or detonation. A gasoline engine has the greatest tendency to knock or detonate when running at a low speed under heavy load with the butterfly valve wide open. Under such circumstances the volumetric efficiency is very high. This results in a large mass of the charge entering the cylinder on each cycle. This large mass is compressed to a high pressure before firing. The design of the engine must be such that the compression pressure under such circumstances is just under the pressure at which detonation or compression knock will occur. When an engine is operating at a moderate speed and under light load the butterfly valve will be nearly closed. A small mass of the charge enters the cylinder (or cylinders) on each cycle. Since the absolute pressure in the manifold (atmospheric pressure minus manifold vacuum) is low the compression pressure is also relatively low. The fuel has no tendency to detonate.

When the engine is operating as described above it is possible to increase the compression ratio without exceeding the pressure at which the fuel will detonate, thus increasing the compression ratio increases the thermal efficiency, and fuel consumption is lowered by the increase in thermal efficiency.

Furthermore, several inventors have seen the desirability of varying the compression ratio of a gasoline engine in accordance with the intake manifold pressure, but such prior art schemes have involved complicated servo motors which were controlled by the intake manifold pressure. In the present invention compression ratio is varied in accordance with the engine torque. The torque developed by an engine depends directly upon the intake manifold pressure. Therefore, the engine torque may be used to vary the compression ratio in such a way as to maintain a constant compression pressure. No servo motor is needed in my invention since engine torque is a powerful force capable of varying the compression ratio with outside aid. An important object of this invention therefore is the provision of means to vary the compression ratio in the manner to be hereinafter described.

Having reference now to Fig. 1, there is generally indicated at 10 one cylinder of a gasoline engine 11 adapted to drive a crank shaft 12 normally in the direction indicated by the arrow. Engine 11 is mounted for rotative or pivotal movement for a purpose to be described hereinafter in concentric bearings 13 supporting trunnions 14.

A spring 15 attached to a suitable lug 16 on cylinder 10 and any suitable fixed portion 17 of the engine housing normally biases engine 11 in a direction counter to the force of the engine torque.

Thus it will be seen that when the torque is low the engine will tend to be held in the position of Fig. 1 by spring 15, but that as the torque increases engine 11 will be rotated or pivoted towards the position of Fig. 2 against the bias of spring 15.

As the engine moves towards the position of Fig. 2 a cam surface 20, pivotally mounted, as by a pivot 21, in a suitable fixed portion 22 of the engine housing varies the position of a cam follower 23, for a purpose to be hereinafter described.

A handle 24 pivoted, as by pivot 25, to a fixed support 26, and having at its end an eccentric 27, is positioned adjacent cam surface 20 in such manner that eccentric 27, when handle 24 is in vertical position abuts and restricts upward movement of, the free end of cam surface 20.

When handle 24 is moved to horizontal position, as shown in dotted lines in Fig. 1, the free end of cam surface 20 is permitted to move upwardly a short distance for a purpose to be described hereinafter.

Having now particular reference to Fig. 1 a spring 30 positioned between a collar 31, fixedly secured to cam follower 23, and the top wall 32 of cylinder 10, biases cam follower 23 into engagement with cam surface 20, and serves, when handle 24 is adjusted towards the horizontal position to the extent desired, to bias the surface 20 upwardly.

The opposite end of cam follower 23 is secured to a rod 35, engaging a supplementary piston 36, within cylinder 10. Also within cylinder 10 is an operating piston 37 having a piston rod 38 secured to crankshaft 12, and butterfly and poppet valves 39 and 40, respectively, all of well known design, purpose and operation.

Now from the foregoing the operation of this apparatus will be readily understood.

As the manifold pressure increases the engine torque will increase proportionately. The greater the torque developed, the greater will be the elongation of spring 15 and the greater will be the rotation of the engine about its trunnions 14. Cam follower 23 slides along the cam surface 20 as the engine rotates. This causes auxiliary piston 36 to move outwardly, which movement changes the volume of the combustion chamber. Movement of auxiliary piston 36 thus changes the compression ratio and a constant, high, uniform compression pressure is maintained in the combustion chamber resulting in high efficiency.

The compression pressure is preferably stabilized at a value just under that which will cause detonation.

Handle 24 and eccentric 27 are provided for two reasons. First, handle 24 is adapted to be moved to horizontal position when the engine is to be started. Auxiliary piston 36 is then raised by pressure of spring 30 and the combustion chamber is enlarged, thus reducing the compression ratio. This is necessary for starting because a large mass of charge might be present in the cylinder. A large mass of charge would cause detonation and (or) hard starting if the compression ratio were not reduced by putting handle 24 in the starting or horizontal position. Handle 24 should be left in the starting position until the engine is warmed up and running smoothly at which time it should be placed in the operating or vertical position in order to achieve maximum economy.

Handle 24 also provides a method of reducing the compression ratio if the engine is not operating satisfactorily. (Faulty operation of the ignition system, for example, would cause the torque to fall off even though the manifold pressure did not change.) A falling off of torque can be easily detected in this device and the operator is thus warned that his engine is not operating satisfactorily. That is to say that the engine is not delivering the torque which it should for the manifold pressure in use. Such a condition might cause detonation. In such a case the handle 24 would be put in the starting position until repairs could be made.

While in the foregoing only one cylinder of an engine has been shown and described, it will be readily understood that the invention is equally applicable to a number of cylinders. Likewise, while one operating handle has been shown as applied to one cylinder it will be understood that such a handle may be so constructed as to act simultaneously on a number of cylinders.

Now from the foregoing it will be seen that there is herein provided a structure accomplishing all the objects of this invention and many others including many advantages of great practical utility.

As many embodiments may be made of this inventive concept, and as many modifications may be made in the embodiment hereinbefore shown and described, it is to be understood that all matter herein described and shown in the accompanying drawing is to be interpreted merely as illustrative and not in a limiting sense.

I claim:

1. In a device of the character described in combination an engine, a cylinder comprising a part of said engine and means operable by the torque developed by said engine for varying the volumetric capacity of said cylinder in accordance with manifold pressure, said last mentioned means comprising a movable auxiliary piston in said cylinder, and means including a cam follower associated with said piston and a cam surface for varying the position of said piston in said cylinder.

2. In a device of the character described in combination an engine mounted for pivotal movement about an axis concentric with the crankshaft thereof, a cylinder comprising part of said engine, means whereby said engine pivots about said axis to a degree proportionate to the torque developed by said engine, and means for varying the volumetric capacity of said cylinder in accordance with the degree of said pivotal movement.

3. In a device of the character described in combination an engine mounted for pivotal movement about an axis concentric with the crankshaft thereof, a cylinder comprising part of said engine, means whereby said engine pivots about said axis to a degree proportionate to the torque developed by said engine, and means for varying the volumetric capacity of said cylinder in accordance with the degree of said pivotal movement, said last mentioned means including a movable auxiliary piston in said cylinder.

4. In a device of the character described in combination an engine mounted for pivotal movement about an axis concentric with the crankshaft thereof, a cylinder comprising part of said engine, means whereby said engine pivots about said axis to a degree proportionate to the torque developed by said engine, and means for varying the volumetric capacity of said cylinder in accordance with the degree of said pivotal movement, said last mentioned means including a movable auxiliary piston in said cylinder, and means for varying the position of said piston in accordance with the position of said engine.

5. In a device of the character described in combination an engine mounted for pivotal movement about an axis concentric with the crankshaft thereof, a cylinder comprising part of said engine, means whereby said engine pivots about said axis to a degree proportionate to the torque developed by said engine, and means for varying the volumetric capacity of said cylinder in accordance with the degree of said pivotal movement, said last mentioned means including a movable auxiliary piston in said cylinder, a cam associated with said piston, and a cam follower coacting with said cam for varying the position of said piston in accordance with the degree of pivotal movement of said engine.

6. In a device of the character described in combination an engine mounted for pivotal movement about an axis concentric with the crankshaft thereof, a cylinder comprising part of said engine, means whereby said engine pivots about said axis to a degree proportionate to the torque developed by said engine, and means for varying the volumetric capacity of said cylinder in accordance with the degree of said pivotal movement, said last mentioned means including a movable auxiliary piston in said cylinder, a cam associated with said piston, and a cam follower coacting with said cam for varying the position of said piston in accordance with the degree of pivotal movement of said engine, and means for varying the position of said cam follower.

7. In a device of the character described in combination an engine mounted for pivotal movement about an axis concentric with the crankshaft thereof, a cylinder comprising part of said engine, means whereby said engine pivots about said axis to a degree proportionate to the torque developed by said engine, and means for varying the volumetric capacity of said cylinder in accordance with the degree of said pivotal movement, said last mentioned means including a movable auxiliary piston in said cylinder, a cam associated with said piston, and a cam follower coacting with said cam for varying the position of said piston in accordance with the degree of pivotal movement of said engine, and manually operable means for varying the position of said cam follower to materially increase the volumetric capacity of said cylinder under predetermined conditions.

8. In a device of the character described in combination an engine mounted for pivotal movement about an axis concentric with the crankshaft thereof, a cylinder comprising part of said engine, means whereby said engine pivots about said axis to a degree proportionate to the torque developed by said engine, and means for varying the volumetric capacity of said cylinder in accordance with the degree of said pivotal movement, said last mentioned means including a movable auxiliary piston in said cylinder, a cam associated with said piston, and a pivotally mounted cam follower coacting with said cam for varying the position of said cam follower to materially increase the volumetric capacity of said cylinder under predetermined conditions, said last mentioned means including a movable eccentric in abutting relationship with said cam follower.

9. In a device of the character described in combination, an engine, means permitting limited rotation of said engine about an axis concentric with the crankshaft thereof, means actuated by the torque of said engine to rotate the same to a degree proportionate to the force of said torque, cylinders comprising part of said engine, and means for varying the compression ratio of said cylinders to a degree proportionate to the force of said torque.

10. In a device of the character described in combination, an engine, means permitting limited rotation of said engine about an axis concentric with the crankshaft thereof, means actuated by the torque of said engine to rotate the same to a degree proportionate to the force of said torque, cylinders comprising part of said engine, and means for varying the compression ratio of said cylinders to a degree proportionate to the force of said torque, said last mentioned means comprising means operable by the rotative movement of said engine for varying the volumetric capacity of said cylinders.

11. In a device of the character described in combination, an engine, means permitting limited rotation of said engine about an axis concentric with the crankshaft thereof, means actuated by the torque of said engine to rotate the same to a degree proportionate to the force of said torque, cylinders comprising part of said engine, and means for varying the compression ratio of said cylinders to a degree proportionate to the force of said torque, said last mentioned means comprising movable auxiliary pistons in each of said cylinders and means activated by the rotative movement of said engine to vary the position of said pistons.

12. In a device of the character described in combination, an engine, means permitting limited rotation of said engine about an axis concentric with the crankshaft thereof, means actuated by the torque of said engine to rotate the same to a degree proportionate to the force of said torque, cylinders comprising part of said engine, and means for varying the compression ratio of said cylinders to a degree proportionate to the force of said torque, said last mentioned means comprising movable auxiliary pistons in each of said cylinders and cam means variable in accordance with the position of said engine, operable to vary the position of said pistons.

13. In a device of the character described in combination, an engine, means permitting limited rotation of said engine about an axis concentric with the crankshaft thereof, means actuated by the torque of said engine to rotate the same to a degree proportionate to the force of said torque, cylinders comprising part of said engine, and means for varying the compression ratio of said cylinders to a degree proportionate to the force of said torque, said last mentioned means comprising movable auxiliary pistons in each of said cylinders and cam means variable in accordance with the position of said engine, operable to vary the position of said pistons, and auxiliary means to vary the position of said cam means independently of said force of said torque.

14. In a device of the character described in combination, an engine, means permitting limited rotation of said engine about an axis concentric with the crankshaft thereof, means actuated by the torque of said engine to rotate the same to a degree proportionate to the force of said torque, cylinders comprising part of said engine, and means for varying the compression ratio of said cylinders to a degree proportionate to the force of said torque, said last mentioned means comprising movable auxiliary pistons in each of said cylinders and cam means variable in accordance with the position of said engine, operable to vary the position of said pistons, and manually operable means including an eccentric coacting with said cam means for varying said compression ratio independently of said torque.

15. In a device of the character described in combination, an engine, means permitting limited rotation of said engine about an axis concentric with the crankshaft thereof, means actuated by the torque of said engine to rotate the same to a degree proportionate to the force of said torque, cylinders comprising part of said engine, and means for varying the compression ratio of said cylinders to a degree proportionate to the force of said torque, and auxiliary means for varying said compression ratio independently of said force of said torque.

ROBERT A. WEATHERUP.